United States Patent
Mietta et al.

[11] Patent Number: 5,923,042
[45] Date of Patent: *Jul. 13, 1999

[54] METHOD AND APPARATUS FOR OPTICALLY SCANNING TRANSPARENT MEDIA

[75] Inventors: Andrea Mietta; Roberto Simmarano, both of Milan, Italy

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/541,754

[22] Filed: Oct. 10, 1995

[30] Foreign Application Priority Data

Oct. 11, 1994 [EP] European Pat. Off. .............. 94115997

[51] Int. Cl.⁶ ...................................... H04N 1/04
[52] U.S. Cl. .................... 250/559.06; 250/235; 358/487; 358/497
[58] Field of Search ..................................... 250/234, 235, 250/559.04, 559.06, 208.1; 358/487, 497, 496, 494, 493, 491, 490, 482, 478, 477, 474; 361/686, 683; 382/312, 321, 322, 232, 324

[56] References Cited

U.S. PATENT DOCUMENTS

| | | | |
|---|---|---|---|
| 3,629,495 | 12/1971 | Cahill | 178/6.6 A |
| 3,886,371 | 5/1975 | Lloyd | 358/497 |
| 4,161,365 | 7/1979 | Anderson et al. | 355/75 |
| 4,525,748 | 6/1985 | Carbone | 358/286 |
| 4,559,564 | 12/1985 | Itoh et al. | 358/487 |
| 4,687,352 | 8/1987 | Igi et al. | 250/235 |
| 4,804,982 | 2/1989 | Norris | 346/160 |
| 5,173,789 | 12/1992 | Renner et al. | 358/475 |
| 5,241,406 | 8/1993 | Johnston et al. | 358/487 |
| 5,266,805 | 11/1993 | Edgar | 250/330 |
| 5,289,000 | 2/1994 | Toyofuku | 250/234 |
| 5,336,878 | 8/1994 | Boyd et al. | 250/234 |
| 5,371,614 | 12/1994 | Ito | 358/487 |
| 5,424,537 | 6/1995 | Lehman et al. | 250/235 |
| 5,537,343 | 7/1996 | Kikinis et al. | 361/686 |
| 5,640,302 | 6/1997 | Kikinis | 361/687 |

FOREIGN PATENT DOCUMENTS

| | | | |
|---|---|---|---|
| 0530027 | 3/1993 | European Pat. Off. | H04N 1/10 |
| 60-046659 | 3/1985 | Japan | H04N 1/12 |
| 2148658 | 9/1984 | United Kingdom | H04N 1/10 |

OTHER PUBLICATIONS

Anderson et al., *Proceedings of the SPIE—The International Society for Optical Engineering*, vol. 1901 pp. 173–181, 1993.

*Primary Examiner*—Que T. Le
*Assistant Examiner*—John R. Lee
*Attorney, Agent, or Firm*—Shelley M Beckstrand; Kenneth A. Seaman; A. P. Tennent

[57] ABSTRACT

An optical scanner device is provided in PCMCIA format for transparent image bearing media (slides or film). The light sensor (420) includes a single photosensitive element, a photodiode, close to the media (415) being scanned; the sensor (420) and the media (415) are relatively movable one in respect of the other in at least two directions, successively acquiring data representing each pixel one at a time. The source light (405) is implemented as a small block of four LEDs (red, green, blue and infrared), including a plexiglass diffuser (410), and it is moved concurrently with the sensor (420). The sensor (420) and the light source (405) can be moved at different selected speeds, providing a scanner with different selectable resolutions.

15 Claims, 3 Drawing Sheets

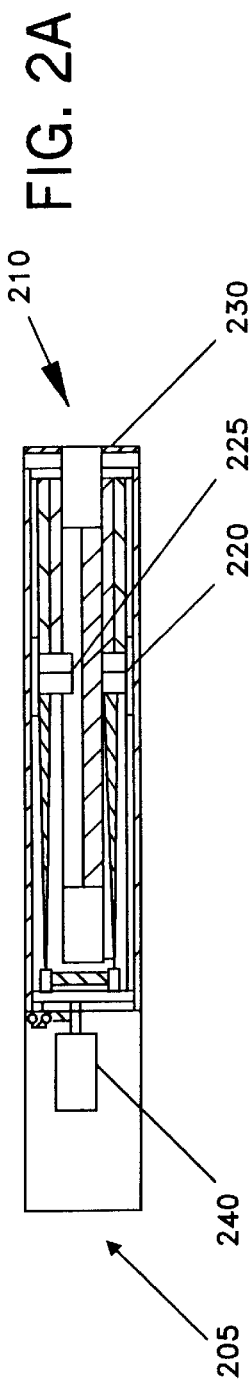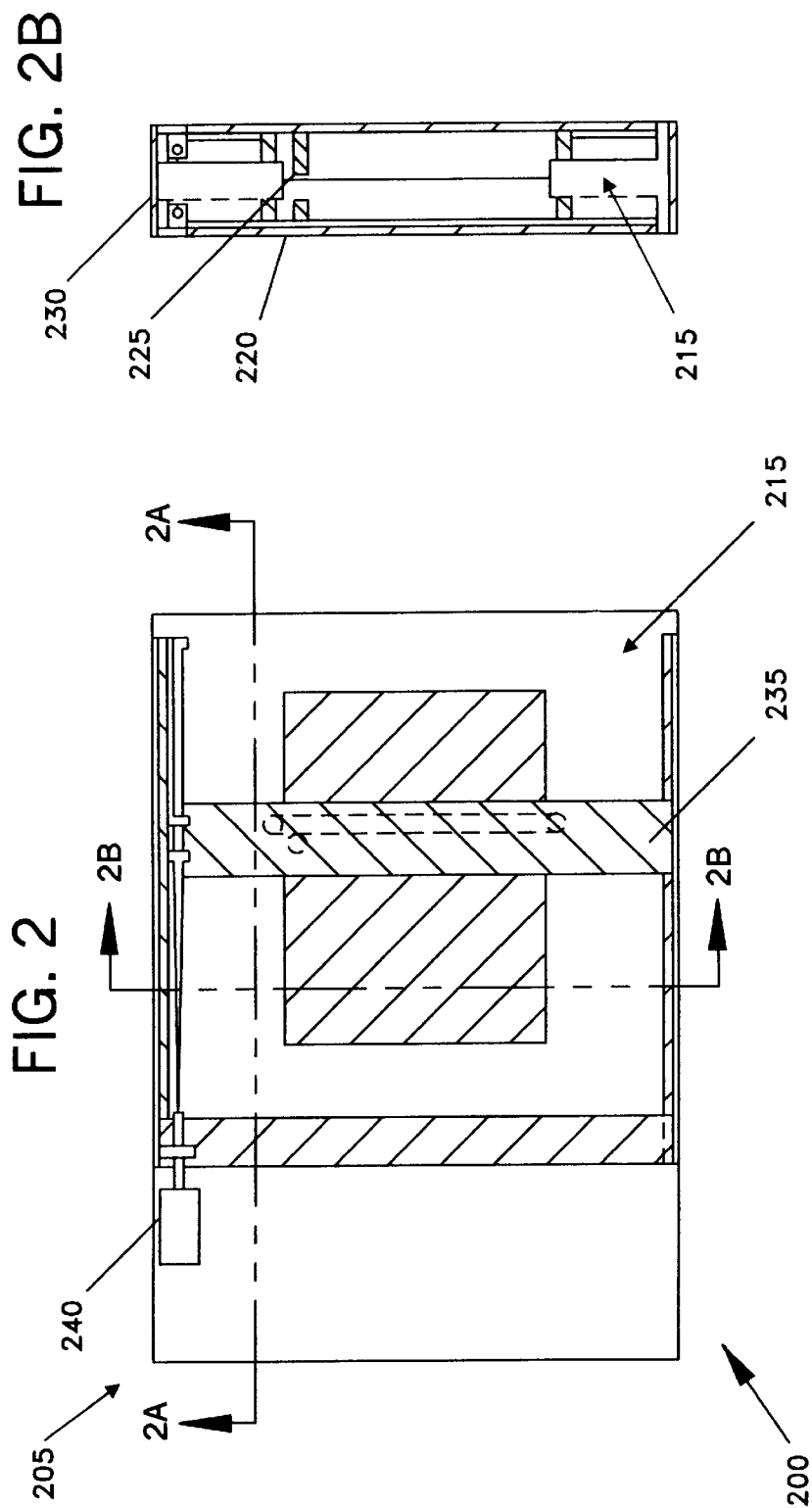

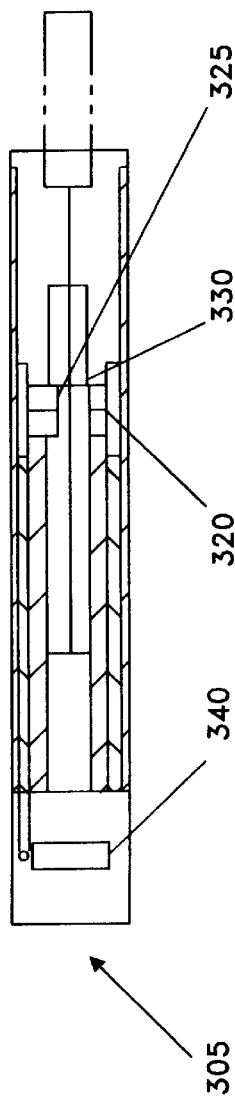
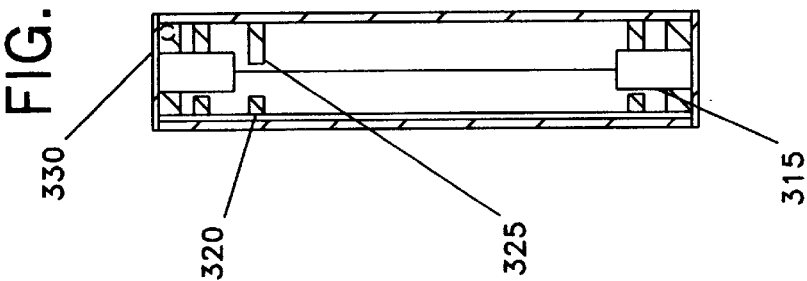
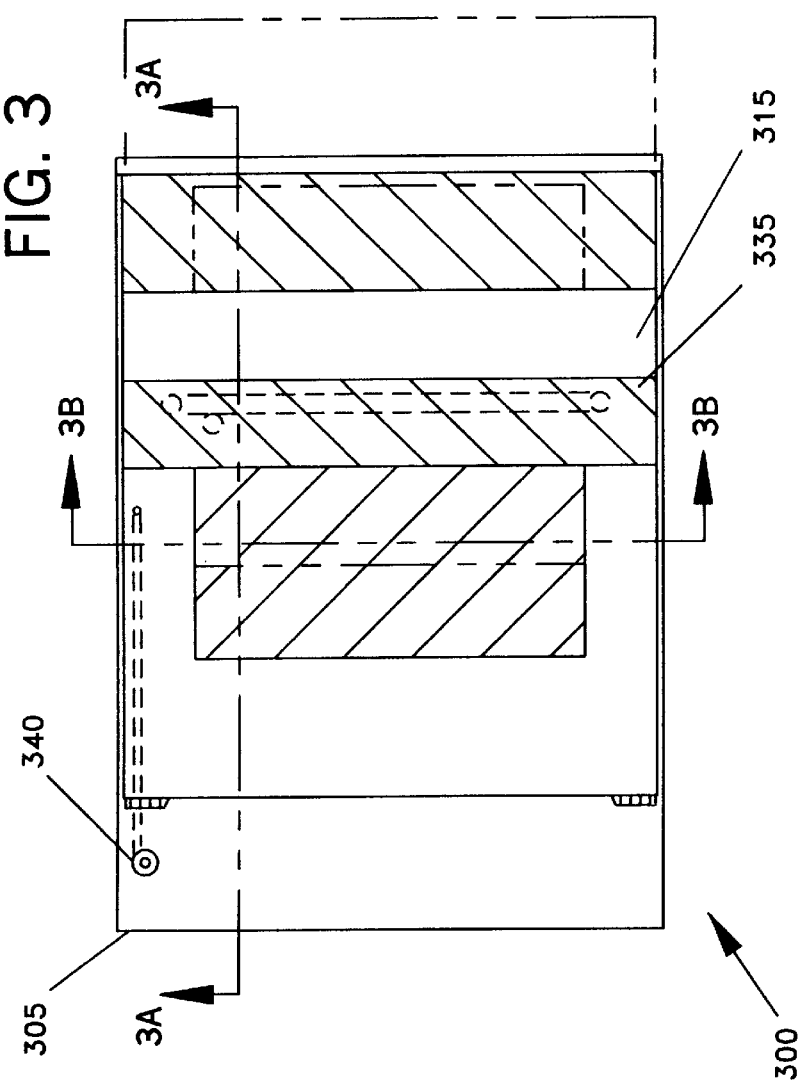

METHOD AND APPARATUS FOR OPTICALLY SCANNING TRANSPARENT MEDIA

BACKGROUND OF THE INVENTION

1. Field of the Invention

The present invention relates to an optical scanner device and in particular to an optical scanner device for acquiring data representing a selected plurality of pixels from a transparent image bearing media, said scanner device including a light source, a light sensor, means for inserting said media in an operative position between said light source and said sensor.

2. Prior Art

An optical scanner is a device that uses light to acquire data from an image bearing media and generates and stores electrical signals, in particular in digital form, corresponding to the scanned image; the term "image" is used in its broadest context to include any graphically represented indices, in particular pictures, drawings and text. Scanners can acquire data from different sources, such as sheets, photos, slides, films, and so on. Scanners are used in facsimile machines, photocopying machines, and are now widely used in the data processing field, particularly in multimedia applications; scanners can also be used to convert traditional photos to digital format, for example for use on CD-ROM.

Referring in particular to a scanner for transparent image bearing media, such as slides/transparencies or negatives/films, the image being scanned is illuminated on one side by a light source, typically a fluorescent or incandescent lamp. The light crosses the image and then strikes a light sensor positioned on the opposite side of the transparent media.

The light sensor includes a plurality of photosensitive elements. Each photosensitive element acquires data corresponding to an elemental area of the scanned image (picture element or pixel). The number of pixels acquired, and therefore, given a selected area to be scanned, the distance between two adjacent picture elements, defines the scanner resolution in the raster pattern corresponding to the original image.

The output voltage of each photosensitive element is converted to a digital value. In a bi-level scanner a simple voltage comparator is used to output a black (0) or white (1) level for each photosensitive element. In a gray-scale scanner, an analog to digital converter (ADC) will output a binary bit pattern corresponding to a gray value for each photosensitive element. Depending on the number of bits assigned to each pixel, the scanner will support different shades of gray; a scanner that supports 64 gray levels, for example, outputs a 6-bit binary value, ranging from black (000000) to white (111111).

In a color scanner, the image is illuminated with different color light sources, usually red, green and blue (RGB), as in a conventional gray-scale scanner. Each color light source allows detection of the corresponding color component value for each pixel; the result is the composite RGB color definition of the scanned image. If for example the ADC supports 256 levels (8 bits) of gray for each color, a standard 24-bit RGB color value is generated to represent each color pixel (for 16.7 million possible colors).

Different approaches are used for supporting color on scanners. The basic color-scanner technology uses a white-light source shining through a rotatable RGB filter assembly onto the image being scanned, effectively creating an alternating sequence of red, green and blue light beams. Another approach to support color on scanners uses three separate light sources, red, green and blue, shining in sequence. Yet another approach uses a color-filter assembly separating the white light after crossing the image into its red, green and blue components.

In addition, an infrared light source can be used to implement a surface defect correction operation, to remove scratches, finger-prints, dust and any artifact from the transparent media surface, as described in U.S. Pat. No. 5,266,805.

Typically, the sensor is a CCD (charge-coupled device). A CCD is an integrated circuit that contains a plurality (an array) of tightly packed photosensitive elements; the output voltage of each photosensitive element is proportional to the amount of light striking it.

The common scanner techniques apply a set of lenses (objectives), to focus the image on the light sensor. Usually, a single scan line from the image is focused onto a linear CCD; scanning then advances to the next scan line, by moving either the light sensor or the transparent image bearing media. An optical path required for correct focusing results in a bulky assembly. Mirrors are often used to reduce the size of the device, implementing a sophisticated folded optical path scheme. In addition to the complicated optical path, optical aberrations may result which need to be corrected for optimum imaging. Several products implementing the above mentioned technology are available on the market by photographic companies, such as Vision 35 by AGFA, RFS 2035 by Kodak, CoolScan by Nikon, SprintScan 35 by Polaroid.

Optical fiber lenses are used in scanners for non-transparent media (e.g., photocopying machines), as described in U.S. Pat. No. 4,559,564. This features a photosensitive plate including a light source and a layer of light sensors (MOS or CCD), with on top a carrier holding optical fiber lenses and a glass protection.

A hybrid image sensor board is also known in the same field, as described in "A novel contact image sensor (CIS) module for compact and lightweight full page scanner applications"—Anderson, E. E., Weng Lyang Wang—*Proceeding of the SPIE—The International Society for Optical Engineering*, Vol. 1901, 1993, pages 173–181. The board (18 mm in thickness) includes a light sensor array, a LED array light source, one to one rod lenses and a cover glass.

A scanner usually has some physical link to a computer for transferring scanned image information to it. Typically, known scanners include a special interface card that plugs into an expansion slot or a SCSI connector. Digital data corresponding to the scanned images transmitted to the computer are then usually stored on disk in a standard file format, most commonly TIFF; that allows for example users to easily capture graphical images, that can be then incorporated into documents.

There are some drawbacks with this prior art. Known scanners, using a set of lenses or equivalent means to focus the image on light sensors, are bulky, cumbersome and desktop oriented; a need exists for a scanner that is small, lightweight, compact and portable. Light sensors used in the prior art are unacceptable because all of them include a protection glass on the photosensitive elements that does not allow said photosensitive elements to be in direct-contact with the transparent media; the photosensitive elements are too far from the protection glass (and consequently from the transparent image bearing media) to ensure good focusing without lenses.

Particularly, portable computers usually offer two slots that are a bus expansion for plugging small size credit-card boards. A common standard communications format for these PC cards is that established by the Personal Computer Memory Card International Association (PCMCIA); some multimedia PCMCIA cards are already available on the market (e.g. for an audio feature). All the scanners known in the art are too large to fit into a PCMCIA box and such format, in particular PCMCIA type III format (85.6 mm in length, 54.0 mm in width and 10.5 mm in thickness) has never been used in similar devices because of physical constraints. In addition, techniques known in the prior art are complex and associated costs of implementation are high, so that available scanners on the market are quite expensive; the cost grows as resolution increases, while lenses are a fixed significant cost. No low-cost scanner exists in the above mentioned format.

The above drawbacks and limitations of the prior art are overcome by the present invention as described and claimed.

SUMMARY OF THE INVENTION

Accordingly, the present invention provides a scanner device as set out above which is characterized by a light sensor comprising in one embodiment a single photosensitive element positioned close to said media in said operative position, said sensor and said media in said operative position being relatively movable one in respect of the other in at least two directions, whereby data representing each of said pixels are successively acquired one at a time by said sensor. This solution implements a one-to-one relationship between the single photosensitive element of the sensor and each pixel of the transparent media, typically a slide or a strip of film inserted in a holder; the photosensitive element is close to the transparent media, substantially in contact with it, and no lens is required to focus the image on the photosensitive element. The light sensor and the transparent media being scanned are relatively movable in two or more directions. For example, the transparent media can be kept stationary, while the light sensor is moved in two orthogonal directions; in a different embodiment, the light sensor is moved in a first direction, while the transparent media is moved in a second direction orthogonal thereto.

This scanner provides all the functions of traditional full-sized scanners at a low price and in a very compact package; it can be used with portable computers, allowing individuals to maintain their productivity while away from the office, just if they were using a desktop system. People working with images for presentations, design and marketing, or professional photographers and amateurs will appreciate the technology progress that makes their job easier and more flexible.

By using such a scanner it is possible to add images to a document, such as a presentation, even at the latest minute, when the user is not in his office but in a demo room or a commercial exhibition far away from his desk. Journalists can add pictures to their articles even when they are far away from their office desk.

In the scanner according to the present invention, as set forth above, the photosensitive element is close to the transparent image bearing media, substantially in contact with it. Typically, the distance between said photosensitive element and said transparent media in said operative position is less than the distance between two adjacent pixels of said selected plurality of pixels; this value provides a good match between each pixel and the photosensitive element, avoiding any interference between adjacent pixels. The single photosensitive element may be implemented with different components, for example, photoelectric cells, phototransistors, and so on. In a preferred embodiment, said single photosensitive element is a photodiode; this provides a sensor that is fast, cheap and with a very good light to voltage conversion dynamics.

In a particular embodiment of the present invention, the sensor includes a rounded head, whereby light is focused on said photosensitive element. The rounded head works as a small focusing mirror or lens, improving focusing on the photosensitive element. This allows for a certain degree of tolerance in the distance between the photosensitive element and the transparent media; this is desirable specially when such light sensor cannot follow perfectly bending of the transparent media. Advantageously, said light source is movable concurrently in fixed space relationship with said sensor. This allows the use of a small light source, requiring a small power supply, very important for a portable device; in addition, being the light source aligned with the pixel and the light sensor, a more uniform illumination of each scanned pixel can be achieved.

In a different advantageous embodiment, the light source includes a single light generator block providing a plurality of selectable color lights. This single light generator block provides a light source that is small, compact and with its center closer to the pixel to be scanned. Different color lights (such as white, yellow and so on) can be used to illuminate the image to be scanned; typically said color lights include a red light, a green light and a blue light to provide red, green and blue color signals from the image on the transparent media. Advantageously, said color lights can also include an infrared light. Such infrared source light is useful to correct surface defects, to remove scratches, finger-prints, dust and any artifact from the transparent media surface. In a preferred embodiment of the present invention, said single light generator block includes a plurality of LEDs, each one of said LEDs providing one of said color lights. The use of LEDs is a good choice because it provides a compact light source, with a good selectivity and a low energy demand. In another advantageous embodiment of the present invention, said light source further includes a diffuser element. This provides a uniform distribution of the light on each pixel to be scanned. The speed of the light sensor motion across the transparent media determines the scanner resolution and then affixed speed limits the scanner resolution to a top fixed value. Preferably, said sensor and said media in said operative position are relatively movable one in respect of the other at different selectable speeds. Such selectable speeds provide a scanner with different selectable resolutions without the need of resealing the image.

The scanner according to the present invention can be plugged into a disk-drive slot or become an external packet-size parallel port scanner. Preferably, said scanner device is in a PCMCIA format, in particular in a PCMCIA type III format. Besides, in an optical scanner device, a method is also disclosed for acquiring data representing a selected plurality of pixels from a transparent image bearing media. Various embodiments of the invention will now be described in detail by way of examples, with reference to accompanying figures.

Other objects and advantages of the present invention will be apparent to those skilled in the art in view of the following description of the preferred embodiments, the appended claims and the accompanying drawings. Various modifications of the present invention will be apparent to those skilled in the art, and some features of the present invention will be useful without corresponding use of the features. Accordingly, the present description should be considered as merely illustrative of the principles of the present invention and not in limitation thereof.

BRIEF DESCRIPTION OF THE DRAWINGS

FIG. 2 is a view of a first embodiment of the scanner according to the present invention.

FIG. 3 is a view of a second embodiment of the scanner according to the present invention.

DETAILED DESCRIPTION OF PREFERRED EMBODIMENT

Figure 1:
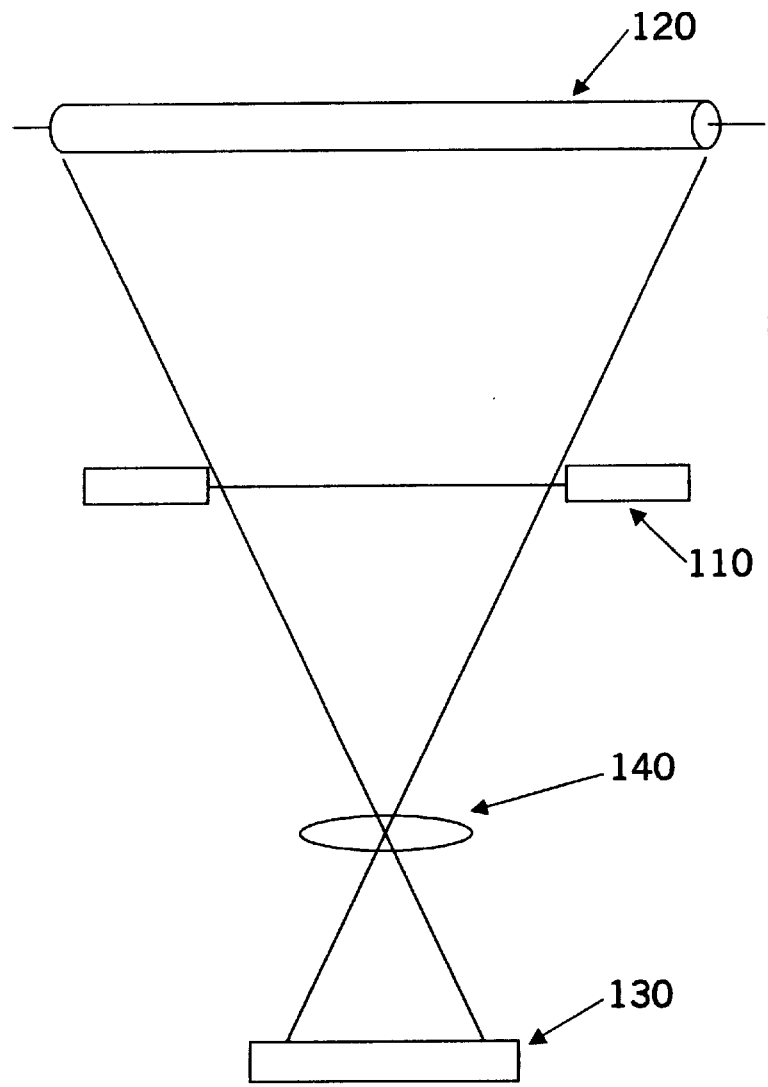
FIG. 1 is a schematic view of an optical scanner known in the art.

With reference now to the figures and in particular with reference to FIG. 1, an optical scanner according to the prior art is depicted. A transparent media 110 to be scanned, bearing the original image, is placed between a light source 120 and a light sensor 130; this transparent image bearing media is for example a slide or a film. The light source 120, usually implemented by a fluorescent or incandescent lamp, illuminates the transparent image bearing media 110. A single line of the image is focused by a lens 140 on the light sensor 130, typically a CCD (charge coupled device).

Referring now to FIG. 2, a first embodiment of the scanner according to the present invention is shown; FIG. 2 shows a top view of the scanner 200 and two cross-sections (A—A and B—B) thereof. The scanner 200 is designed to fit the tight PCMCIA type III specification sizes, namely 85.6× 54×10.5 mm, including a bus connector 205 on its rear side, provided to plug the scanner into a bus slot of a portable personal computer. On the opposite (front) side of the scanner a feeding aperture 210 (cross-section A—A) is provided; such side is accessible to the user, in order to insert a transparent image bearing media 215 in the scanner 200. If the transparent media 215 is a slide, it can be directly inserted in the feeding aperture 210 of the scanner 200; The common slide holders have a rectangular frame up to 3 mm thick; the piece of film is in the frame aperture (about 36×24 mm), in a recessed plane relative to the upper frame surfaces. In case of a film, the same must be inserted in a proper holder, allowing at least a single frame scan. The holder can be a single photograph frame (slide like), or, better, a device holding a strip of film with more than one picture. In the case of a symmetrical holder with two pictures, it can be inserted in both directions according to the picture to be scanned, with obviously half the holder extending externally to the scanner 200. The transparent media 215 to be scanned is inserted between a light source 220 and a light sensor 225, like in any slide/film scanner. In the scanner according to the present invention, the sensor 225 comprises a single photosensitive element close to, substantially in contact with, the transparent image bearing media 215. That means that the distance between the transparent media 215 and the photosensitive element is very small and ideally it should be zero; typically, such distance is less than the distance between two adjacent pixels (pixel numerical aperture). This short distance provides a match between each pixel and the photosensitive element; a lens reduction scheme is not required now since there is a one-to-one relationship between the sensor and each pixel being scanned. The closeness or the contact between the photosensitive element and the transparent image bearing media 215 is important to avoid any interference between adjacent pixels which would cause ghost images, alias effects and focus degrade; elastic snaps 230 or similar means may be used to apply the right pressure to the transparent media 215 and to ensure the closeness of the photosensitive element with respect to the transparent media 215.

The single photosensitive element reading a single pixel at a time is implemented with a photodiode; this kind of light sensor is preferable because it combines a very low cost and a very good light to voltage conversion dynamics. Focusing on the photodiode 225 is obtained by the closeness of the photosensitive element with the transparent image bearing media 215. In order to get a better focusing, the photodiode 225 can be manufactured with a rounded, concave tiny head working as a small lens; this improvement allows a certain degree of tolerance in the distance between the transparent media 215 and the photosensitive element and consequently it avoids the requirement of an actual contact between them. In order to acquire data from the transparent media 215, the light sensor 225 is moved relatively crosswise the media 215. In the depicted embodiment, the transparent media 215 has no external motion during scanning, while the light sensor 225 is moved in two orthogonal directions crosswise the transparent media 215, scanning each line of pixels, much like in a TV raster beam system. The photodiode 225 is mounted on a card 235 (top view), whereon it is moved forward and backward to scan a single line of pixels at a time by using, for example, the reading head moving device of a diskette drive. The motion in the direction orthogonal to each scan line is based on an endless screw-shaft system driven by a motor 240 that moves the card 235 carrying the photodiode 225 from the front side of scanner 200 to the rear side of it and vice-versa. The light source 220, as described in detail later, is built as a small block of four LEDs, red, green, blue and infrared. The source light 220 is moved concurrently in a fixed space relationship with the light sensor 225 on the opposite side of the transparent media 215, using the same driving mechanism. The four LEDs are turned on alternatively for each pixel, so that each pixel is acquired as an interleaved pattern of red, green, blue and infrared components. The result is a raster image of red, green, blue and infrared pixels. The motion speed of the photodiode 225 crosswise the film 215 is controlled through a DC motor and determines the scanner resolution. A fixed speed limits the scan time to a top-value; a resealing process, usually implemented by software, is then required to change the resolution to a different value. A programmable speed motion of the light sensor 225 and the light source 220 is used to scan images at the chosen resolution without resealing the top-resolution image. A typical top-quality scanning requires a 3×3 micron pixel size that calls for very tight requirements on the mechanical design and speed control. In addition, a software process can in addition be used to compensate for the irregular scanning lattice generated by the mechanical components, but it still requires tight repeatability control of the scanning system. A reference transparent image bearing media and a calibration software provides an easy way to compute the compensation tables to be applied during normal scanning. The calibration process can be run at user request. An example of mechanical performance and scan speed is detailed for a 3072×2048 image resolution scanner. Such scanner can be used to convert traditional photographs to digital images for use with PhotoCD applications (PhotoCD is a trademark of Kodak Corp.), a very interesting feature for professional photographers and photo shops markets. Assuming:

| | |
|---|---|
| Sampling Frequency (4 bands) | SF = 100 KHz |
| Crosswise resolution | C = 2048 pixels |
| Lengthwise resolution | L = 3072 pixels |
| Crosswise Length | CL = 24 mm |
| Crosswise Width | CW = 36 mmit follows: |
| Crosswise Samples (4 bands) | CS = C * 4 = 8192 pixels |
| Crosswise Active scan time | CA = CS / SF = 81.92 ms |
| Crosswise Retrace time | CR = CA * 5% = 4.096 ms |
| Crosswise Period | CP = CA + CR = 86.016 ms |
| Crosswise Linear Speed | CLS = CL / CP = 279 mm/s |
| Lengthwise Period | VP = CP * L = 264 s |
| Lengthwise Linear Speed | LLS = CW / VP = 0.17 mm/s |

A second embodiment of the scanner according to the present invention is depicted in FIG. 3, showing a top view of the scanner and two cross-sections (A—A and B—B) thereof. The scanner 300, in a PCMCIA type III format, includes a bus connector 305 on its rear side and a feeding aperture 310 on the front side for inserting a transparent image bearing media 315. The scanner 300 is based on the same principle described above, with the difference that the card 335 carrying the light source 320 and the photodiode 325 is in a stationary position, whilst the transparent media 315 is moved over it, as in a common page scanner. Elastic snaps 330 are used to ensure the closeness of the photosensitive element of the light sensor 325 with respect to the media 315. The reading head moving device of a diskette drive is used to move the photodiode 325 and the light source 320 to and from the transparent media 315; an endless screw-shaft system driven by a motor 340 is used to move the transparent image bearing media 315 inward and outward the scanner 300.

Figure 4:
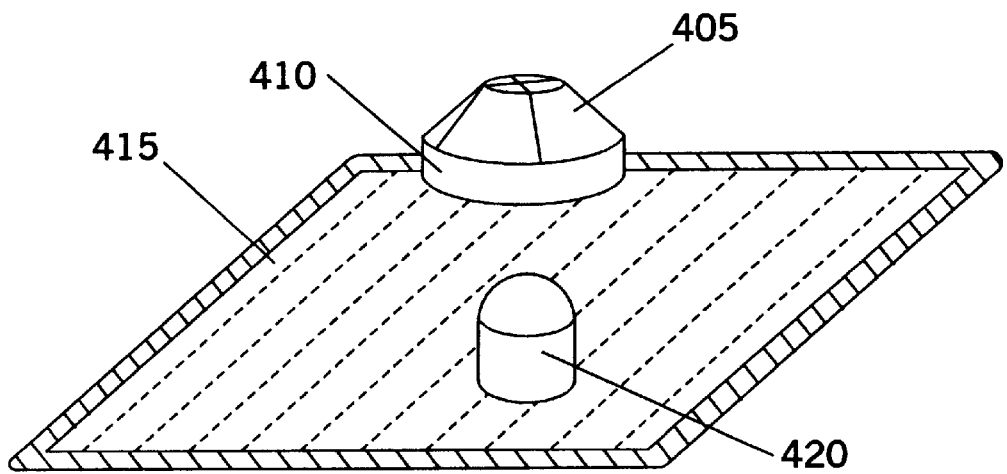
FIG. 4 is a perspective view of the source light used in a preferred embodiment of the present invention.

Referring now to FIG. 4, a perspective view of the light source used in the above described scanner is depicted. The light source 405 is built as a compact small block of a plurality of LEDs, usually red, green and blue; an infrared led can in addition be used to apply a surface defect correction. The LED source represents a good choice in terns of selective light, dimensions and low-energy consumption. A light diffuser 410, for example a cheap grained plexiglass, is added to ensure a uniform illumination of each pixel of the transparent media 415. The light from the light source 405 then crosses the transparent image bearing media 415 and is sensed by the photodiode 420 as described above.

Of course, many modifications may be made to the present embodiments without departing from the spirit of the present invention; and some features of this invention are obvious without the corresponding use of the features. The foregoing description is thus considered as illustrative of the principles of the present invention and is not considered to be a limitation thereof. The scope of the invention is solely defined by the following claims.

Having thus described the invention, what is claimed is:

1. An optical scanner for acquiring data representing a selected plurality of pixels from transparent image bearing media, said scanner including:

a light source;

a light sensor;

means for positioning said media in an operative position between said light source and said light sensor, characterized in that said sensor comprises a single photosensitive element in substantial contact with said media, means for moving one of said light sensor and said media in at least two directions, and means for controlling the movement of the moving means, whereby data representing each of said pixels are successively acquired one at a time by said sensor.

2. An optical scanner of the type set forth in claim 1, wherein the distance between said photosensitive element and said transparent media in said operative position is within the range of direct contact to a distance which is less than the distance between two adjacent pixels of said selected plurality of pixels.

3. An optical scanner of the type set forth in claim 1, wherein said single photosensitive element is a photodiode.

4. An optical scanner of the type set forth in claim 1, wherein the light sensor includes a rounded reflector for focusing light on said light sensor, and wherein said means for positioning achieves substantial contact by positioning said light sensor at a distance from said media which is less than the distance between two adjacent pixels.

5. An optical scanner of the type set forth in claim 1, wherein the light source is movable concurrently in fixed space relationship with said sensor.

6. An optical scanner of the type set forth in claim 5 wherein the light source includes a single light generator block providing a plurality of selectable color lights.

7. An optical scanner of the type set forth in claim 6, wherein the plurality of selectable color lights include a red light, a green light and a blue light.

8. An optical scanner of the type set forth in claim 6, wherein said plurality of selectable color lights include an infrared light.

9. An optical scanner of the type set forth in claim 6, wherein the single light generator block includes a plurality of light emitting diodes (LEDs), each one of said LEDs providing one of said color lights.

10. An optical scanner of the type set forth in claim 6, wherein said light source further includes a diffuser element for diffusing light from the light source.

11. An optical scanner of the type set forth in claim 1, further characterized in that the light sensor and the image bearing media is relatively movable at different selectable speeds in the two directions.

12. An optical scanner of the type set forth in claim 1, wherein said scanner includes means for producing data in an industry standard format in response to the light sensor and the image bearing media.

13. In an optical scanner device, a method for acquiring and storing data representing selected plurality of pixels from a transparent image bearing media, said method comprising the steps of:

inserting said media between a light source and a light sensor, with said light sensor in substantial contact with said media;

illuminating said media with said light source;

relatively moving said sensor and said media in at least two directions; and successively acquiring and storing one at a time data representing each of said pixels with said sensor.

14. A method of acquiring and storing data including the steps of claim 13 and further including the step of moving said light source concurrently in fixed space relationship with said sensor.

15. An optical scanner device of the type described in claim 1 wherein the light source, light sensor and means for moving are packaged within an industry standard package.

* * * * *